(12) United States Patent
Neuffer

(10) Patent No.: US 8,545,014 B2
(45) Date of Patent: Oct. 1, 2013

(54) OPTICAL LENS WITH ANTISTATIC COATING

(75) Inventor: Andreas Neuffer, Asperg (DE)

(73) Assignee: Carl Zeiss Vision GmbH, Aalen (DE)

( * ) Notice: Subject to any disclaimer, the term of this patent is extended or adjusted under 35 U.S.C. 154(b) by 65 days.

(21) Appl. No.: 13/247,330

(22) Filed: Sep. 28, 2011

(65) Prior Publication Data

US 2012/0081660 A1    Apr. 5, 2012

Related U.S. Application Data

(60) Provisional application No. 61/388,984, filed on Oct. 1, 2010.

(30) Foreign Application Priority Data

Oct. 1, 2010  (DE) .......................... 10 2010 048 089

(51) Int. Cl.
*G02C 7/02* (2006.01)
(52) U.S. Cl.
USPC ..................................... 351/159.57; 359/585
(58) Field of Classification Search
USPC .............. 351/159.57, 62; 359/581, 582, 585, 359/507; 427/164, 331
See application file for complete search history.

(56) References Cited

U.S. PATENT DOCUMENTS 5,719,705 A * 2/1998 Machol .......................... 359/581

| 2003/0038028 A1 | 2/2003 | Schultheis et al. |
| 2003/0179343 A1 | 9/2003 | Marechal et al. |
| 2004/0005482 A1 | 1/2004 | Kobayashi et al. |
| 2007/0178315 A1 | 8/2007 | Thomas et al. |

FOREIGN PATENT DOCUMENTS

| DE | 696 30 526 T2 | 8/2004 |
| EP | 1 284 302 A1 | 2/2003 |
| EP | 1 546 431 B1 | 6/2005 |
| WO | WO 96/41215 | 12/1996 |
| WO | WO 2010/113622 A1 | 10/2010 |

OTHER PUBLICATIONS

European Patent Office; English language translation of the European Search Report; Dec. 6, 2011; 6 pages.
Hiroto Unno et al, Microstructures and electrical properties of $TiO_2$-doped $Al_2O_3$ ceramics, Journal of Electron Microscopy 59 (Supplement): S107-S115 (2010).

* cited by examiner

*Primary Examiner* — Scott J Sugarman
*Assistant Examiner* — William R Alexander
(74) *Attorney, Agent, or Firm* — Harness, Dickey & Pierce, P.L.C.

(57) ABSTRACT

The present invention relates to an optical lens, in particular for use as a spectacle lens, having a lens element and a coating for producing an antistatic effect, said coating being applied onto the lens element and having a plurality of layers. Further, the antistatic effect is provided by two layers adjoining one another, wherein at least one of the two layers adjoining one another is formed in a non-stoichiometric fashion. Furthermore, the present invention relates to a method for producing a corresponding optical lens.

8 Claims, 3 Drawing Sheets

OPTICAL LENS WITH ANTISTATIC COATING

CROSS-REFERENCE TO RELATED APPLICATIONS

This application claims the priority of German patent application DE 10 2010 048 089.4, filed Oct. 1, 2010, and the priority of U.S. provisional application No. 61/388,984, filed Oct. 1, 2010. The entire contents of these priority applications are incorporated herein by reference.

BACKGROUND OF THE INVENTION

The present invention relates to an optical lens, in particular for use as a spectacle lens, having a lens element and a coating for producing an antistatic effect, said coating being applied to the lens element and having a plurality of layers.

Furthermore, the present invention relates to a method for producing an antistatic coating having a plurality of layers for a lens element.

Antistatic spectacle lenses afford the advantage that dirt particles adhere to the spectacle lenses to a lesser extent on account of absent electrostatic attraction forces. Without an antistatic coating, a spectacle lens is soiled more rapidly and therefore has to be cleaned more often. Furthermore, the dirt is often difficult to remove. Therefore, in the case of the coating of spectacle lenses, a conductive and thus antistatic layer is usually inserted into the coating. For this purpose, hitherto an individual layer has been inserted into the antireflective coating of the spectacle lens.

One example of a coating can be gathered from the document US 2003/0179343 A1, for example. It describes a coating in which an antistatic layer composed of indium tin oxide (ITO) having a specific thickness is inserted into the antireflective coating. However, the insertion of such an ITO layer into the antireflective coating has certain disadvantages such as higher costs for the coating and impairment of the mechanical and optical properties of the antireflective coating.

Therefore, it is an object of the present invention to provide an antistatic coating for an optical lens, more particularly a spectacle lens, which can be integrated simply and cost-effectively into an antireflective coating of the optical lens.

BRIEF SUMMARY OF THE INVENTION

In accordance with a first aspect of the invention, therefore, there is provided an optical lens, in particular for use as a spectacle lens, having a lens element and a coating for producing an antistatic effect, said coating being applied to the lens element and having a plurality of layers, wherein the antistatic effect is provided by two layers adjoining one another, wherein at least one of the two layers adjoining one another is formed substoichiometrically.

In accordance with a second aspect of the invention, there is provided a method for producing an antistatic coating having a plurality of layers for a lens element, the method comprising the step of applying two layers adjoining one another are applied, wherein the antistatic effect is provided by the two layers adjoining one another, and wherein at least one of the two layers adjoining one another is formed substoichiometrically.

In this case, "substoichiometric" should be understood to mean that when the corresponding layer is applied, an oxygen inflow is kept lower than is necessary to obtain a stoichiometric ratio in the applied layer. Consequently, an oxygen deficiency prevails in the stoichiometric layer.

In this way, according to the invention, the antistatic effect is not obtained by means of a single layer made from conductive material but rather from a composite of two materials which produce a conductive interlayer or a conductive interface given suitable process control during the application of the layers.

As customary processes for producing such layers, PVD (Physical Vapour Deposition), e.g. the vaporization of solid substances by means of an electron beam, sputtering or arc vaporization, and also IBAD (Ion Beam Assisted Deposition), are known. However, all other physical vaporization processes with or without assistance of ions or plasma and also chemical processes such as CVD (Chemical Vapour Deposition) or the plasma-assisted variants thereof such as PECVD (Plasma Enhanced Chemical Vapour Deposition) or PICVD (Plasma Impulsed Vapour Deposition) are also possible.

By virtue of one of the two layers adjoining one another being formed in a substoichiometric fashion and the two layers having direct contact with one another, a conductive boundary layer can form between the two layers. An antistatic effect is produced by the conductivity of said boundary layer. If the materials of the two layers adjoining one another are used anyway for layers of the antireflective coating, particularly simple integration of an antistatic effect into an antireflective coating can be effected in this way.

In particular, according to the invention, there is provided an optical lens having a lens element and a coating for producing an antistatic effect, said coating being applied onto the lens element and having a plurality of layers, wherein the antistatic effect is provided by two layers adjoining one another, wherein the two layers adjoining one another are provided by a first substoichiometrically formed layer of $TiO_x$, with $x<2$, and a second layer of $Al_2O_3$. Thereby, the second layer is applied after the first layer. Hence, the second layer is positioned above the first layer. By this, the second layer is positioned farther away from the lens element than the first layer.

In particular, according to the invention, there is further provided a method for producing an antistatic coating having a plurality of layers for a lens element, comprising the following steps:

applying a first layer of $TiO_x$, wherein the first layer is applied substoichiometrically with $x<2$, and applying a second layer of $Al_2O_3$ onto the first layer.

In one refinement of the optical lens in accordance with the first aspect of the invention, it is provided that the two layers adjoining one another are provided by a first layer, which is produced from titanium oxide ($TiO_2$), and a second layer, which is produced from aluminium oxide ($Al_2O_3$).

The materials $TiO_2$ and $Al_2O_3$ are traditional materials for producing optical layer systems. In particular, $TiO_2$ as high refractive index material and $Al_2O_3$ as low refractive index material are used on account of their high degree of transparency for producing antireflective coatings of optical lens elements. These layers act individually like customary oxidic layers without a significant conductivity. In the composite, however, such a coating can have a conductivity, which then has an antistatic effect.

In particular, it is provided in this case that the first layer, i.e. the layer produced from $TiO_2$, is formed substoichiometrically.

The substoichiometric layer composition thus results as $Ti_{>1}O_{<2}$ or $TiO_{2-y}$. In other words, the first layer is produced from $TiO_x$ with $x<2.0$, in particular $1.66<x<2$. In particular, the first layer can be formed with an oxygen proportion of less than $TiO_2$, in particular less than $TiO_{1.95}$, in particular less than $TiO_{1.9}$, in particular less than $TiO_{1.85}$, but in particular with an oxygen proportion of more than $TiO_{1.66}$, in particular more than $TiO_{1.7}$, in particular more than $Ti_{1.75}$, in particular more than $TiO_{1.85}$. In particular, the substoichiometric composition of the first layer can be formed between $TiO_{1.66}$ and $TiO_2$, in particular, it is formed between $TiO_{1.7}$ and $TiO_{1.95}$, in particular between $TiO_{1.75}$ and $TiO_{1.9}$, in particular between $TiO_{1.8}$ and $TiO_{1.85}$. In particular, the first layer can be formed from, for instance, $TiO_{1.66}$; $TiO_{1.7}$; $TiO_{1.75}$; $TiO_{1.8}$; $TiO_{1.85}$; $TiO_{1.9}$; $TiO_{1.95}$; $TiO_{1.97}$. Furthermore, the first layer can also be formed between $TiO_{1.66}$ and $TiO_{1.8}$; it can also be formed between $TiO_{1.8}$ and $TiO_{1.95}$.

The application both of $TiO_2$ and of $Al_2O_3$ with desired layer thicknesses is known in the prior art. By way of example, document EP 1 284 302 B1 discloses one possibility for producing $TiO_2$ sputtering targets.

In order to provide the first layer produced from $TiO_2$, a PVD method, for example, can be applied. In this case, the substance $Ti_3O_5$ is used as a customary starting substance for producing $TiO_2$. In order to achieve a transparent oxidic $TiO_2$ layer, oxygen is normally concomitantly admitted into the vaporization chamber during the vaporization process. This process can additionally be assisted with ions in order to achieve particularly high refractive index and compact layers. With a specific evaporation rate and a specific quantity of oxygen which is concomitantly admitted into the vaporization area during vaporization, a stoichiometric layer, i.e. exactly $TiO_2$, is normally obtained. With a slightly smaller oxygen inflow, the above-described substoichiometric layer with then $Ti_{>1.0}O_{<2.0}$ is obtained.

In one refinement of the first aspect, it can be provided that the first layer is applied after the second layer. However, it is also possible for the second layer to be applied after the first layer.

In this case, the term "after" relates to the order of applying the layers to the optical lens element during the application process. If the lens element is designated in cross section as the bottommost layer, a succeeding layer is thus arranged further above.

If the first layer, i.e. the $TiO_2$ layer, is applied after the second layer, i.e. the $Al_2O_3$ layer, care must be taken to ensure that initially there is still no oxygen excess in the vaporization area, in order that the $TiO_2$ layer remains substoichiometric and in order that the conductivity of the $TiO_2$ layer is also maintained. Therefore, the opposite order, i.e. the application of the $Al_2O_3$ layer, i.e. the second layer, onto the $TiO_2$ layer, i.e. the first layer, affords an advantage since it is not necessary to consider the oxygen excess in the vaporization area.

In a further refinement, it can be provided that a third layer, which is produced from $TiO_2$, is applied onto the second layer. A $TiO_2$—$Al_2O_3$—$TiO_2$ coating thus results.

Furthermore, it can be provided that, upon opposite application of the first layer and the second layer, a fourth layer, which is produced from $Al_2O_3$, is applied onto the first layer. Consequently, an $Al_2O_3$—$TiO_2$—$Al_2O_3$ layer then results.

When applying the fourth layer, in this case care must be taken to ensure that said layer is applied by vapour deposition without oxygen additionally admitted into the vaporization area and without ion assistance. This ensures that in the boundary layer between the substoichiometric $TiO_2$ layer and the $Al_2O_3$ layer, i.e. the first and second layers, no additional oxygen is incorporated which can reduce or prevent the conductivity by altering the substoichiometric $TiO_2$ layer in the direction of a stoichiometric $TiO_2$ layer.

In the method in accordance with the second aspect of the invention, too, it can be provided that the two layers adjoining one another are provided by a first layer, which is produced from $TiO_2$ and a second layer, which is produced from $Al_2O_3$. In particular, it is also possible in this case for the first layer to be formed substoichiometrically.

Furthermore, instead, the first layer can be applied after the second layer or the second layer can be applied after the first layer.

If the second layer is applied after the first layer, then a third layer, which is produced from $TiO_2$, can be applied onto the second layer.

If the first layer is applied after the second layer, a fourth layer, which is produced from $Al_2O_3$, can be applied to the first layer. In this case it is provided, in particular, that the fourth layer is applied without additional oxygen and/or without ion assistance.

The method in accordance with the second aspect of the invention thus has the same advantages as the optical lens in accordance with the first aspect of the invention.

An antistatic effect is usually measured by means of an electric field strength measuring device at a defined distance. An antireflective layer without a conductive layer attains a field strength of several kilovolts (kV) after charging by means of a suitable material, for instance a brush or a cloth. An optical lens having a coating having an antistatic effect remains distinctly below a limit of one kV in the case of such charging. The antistatic effect of the coating present here has such a high dissipating capability that the charging remains almost zero.

It goes without saying that the features mentioned above and those yet to be explained below can be used not only in the combination respectively indicated, but also in other combinations or by themselves, without departing from the scope of the present invention.

BRIEF DESCRIPTION OF THE SEVERAL VIEWS OF THE DRAWING

Exemplary embodiments of the invention are illustrated in the drawing and are explained in greater detail in the following description. In the figures.

DETAILED DESCRIPTION OF THE INVENTION

Figure 1:
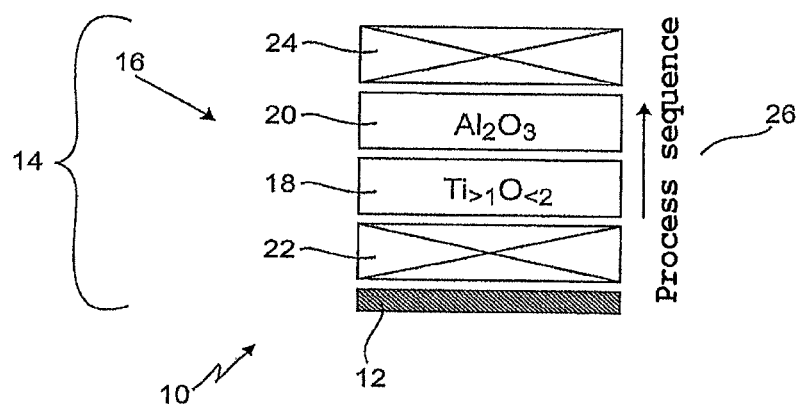
FIG. 1 shows a schematic cross-sectional view of an optical lens in a first embodiment.

FIG. 1 shows an optical lens 10 in an embodiment. The optical lens 10 has a lens element 12 provided with a coating 14. The coating 14 has a plurality of layers 16 applied successively.

In particular, the coating 14 has a first layer 18, which is formed from titanium oxide ($TiO_2$) in a substoichiometric ratio. In this case, the term "substoichiometric" denotes that an oxygen deficiency prevails; the composition therefore results as $Ti_{>1}O_{<2}$. A second layer 20, which is produced from aluminium oxide ($Al_2O_3$), is provided thereon. The substoichiometric first layer 18 and the second layer 20 together form a conductive boundary layer, which, on account of its conductivity, integrates an antistatic effect into the optical lens 10.

The arrangement of the first layer 18 and the second layer 20 within the coating 14 need not necessarily be at a surface of the coating 14. Lower layers 22 providing a further antireflective effect, for example, can be provided between the first layer 18 or the second layer 20 and the lens element 12. Further upper layers 24, for example a superhydrophobic termination layer (not illustrated), can be provided above the first layer 18 or the second layer 20.

The designations "top" and "bottom" and "after" and "before" in this case relate to a process sequence 26. The plurality of layers 16 of the coating 14 are applied to the lens element 12 successively. Accordingly, the lens element 12 forms a lower termination. A subsequently applied layer of the plurality of layers 16 is thus situated further away from the lens element 12 and thus further above than layers of the plurality of layers 16 that were applied earlier.

Consequently, in the embodiment illustrated, the antistatic effect is provided by two layers adjoining one another, namely the first layer 18 and the second layer 20, wherein one of the two layers adjoining one another is formed in a substoichiometric fashion, namely the first layer 18.

Figure 2:
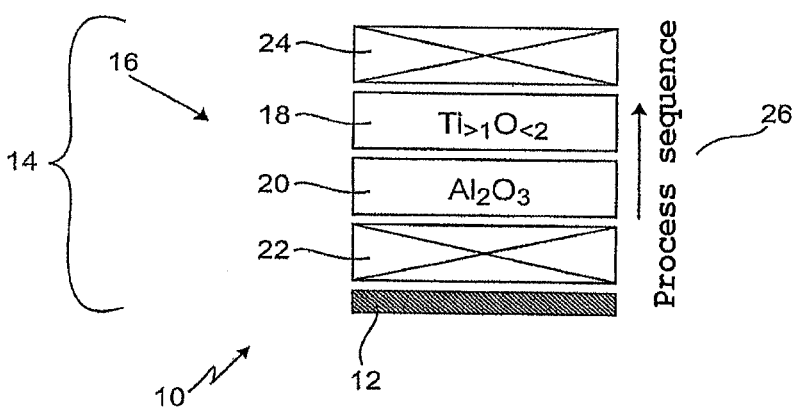
FIG. 2 shows a schematic cross-sectional view of an optical lens in a second embodiment.

FIG. 2 illustrates a further embodiment of the invention. FIG. 2 likewise shows an optical lens 10 having a lens element 12 with a coating 14. The coating likewise comprises a plurality of layers 16. In the embodiment illustrated in FIG. 2, the first layer 18 and the second layer 20 are applied in the opposite order. In this case, the second layer 20, produced from $Al_2O_3$, is applied first and the first layer 18, produced from $TiO_2$ in a substoichiometric ratio, is applied subsequently.

This embodiment also forms a conductive boundary layer between the first layer 18 and the second layer 20, such that an antistatic effect is provided. Advantageously, the materials used are also customary for providing a coating having an antireflective effect, such that the antistatic effect can be integrated into an antireflective coating of a lens element 12 in a simple manner.

Figure 3:
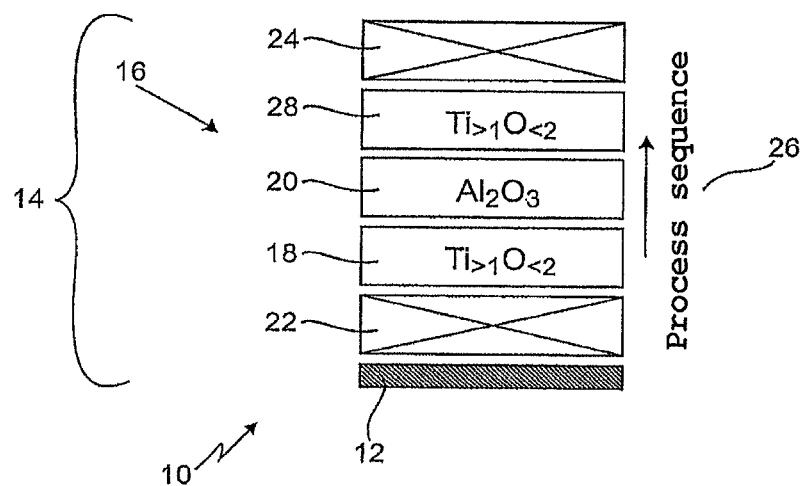
FIG. 3 shows a schematic cross-sectional view of an optical lens in a third embodiment.

FIG. 3 shows a further embodiment of the invention. The embodiment illustrated in FIG. 3 substantially corresponds to the embodiment illustrated in FIG. 1; therefore, identical elements are designated by the same reference symbols and only the differences are discussed below.

In the embodiment in FIG. 3, a third layer 28, which is likewise formed from $TiO_2$ in a substoichiometric ratio, is applied to the second layer. Consequently, both the first layer 18 and the second layer 20, and the second layer 20 and the third layer 28 form a conductive boundary layer, such that the antistatic effect of the entire coating 14 is improved.

Figure 4:
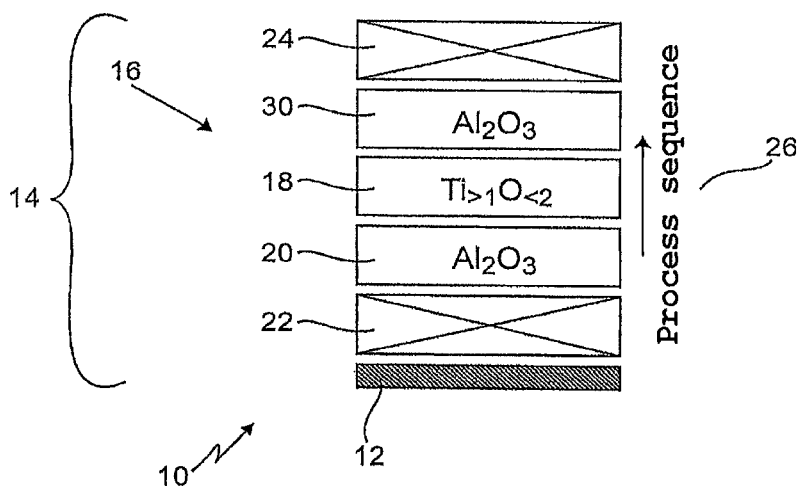
FIG. 4 shows a schematic cross-sectional view of an optical lens in a fourth embodiment.

FIG. 4 shows yet another embodiment of the invention. The embodiment in FIG. 4 substantially corresponds to the embodiment illustrated in FIG. 2, such that identical elements are identified by the same reference symbols. Only the differences are discussed below.

In the embodiment illustrated in FIG. 4, a fourth layer 30 composed of $Al_2O_3$ is applied to the first layer 18, which is provided from $TiO_2$ in a substoichiometric ratio. In this case, care should be taken to ensure that the fourth layer 30 is applied without additional oxygen, in order that the first layer 18 does not revert to a stoichiometric ratio. Once again, a conductive boundary layer is formed both between the first layer 18 and the second layer 20, and between the first layer 18 and the fourth layer 30, and the antistatic effect of the coating 14 is increased.

Figure 5:
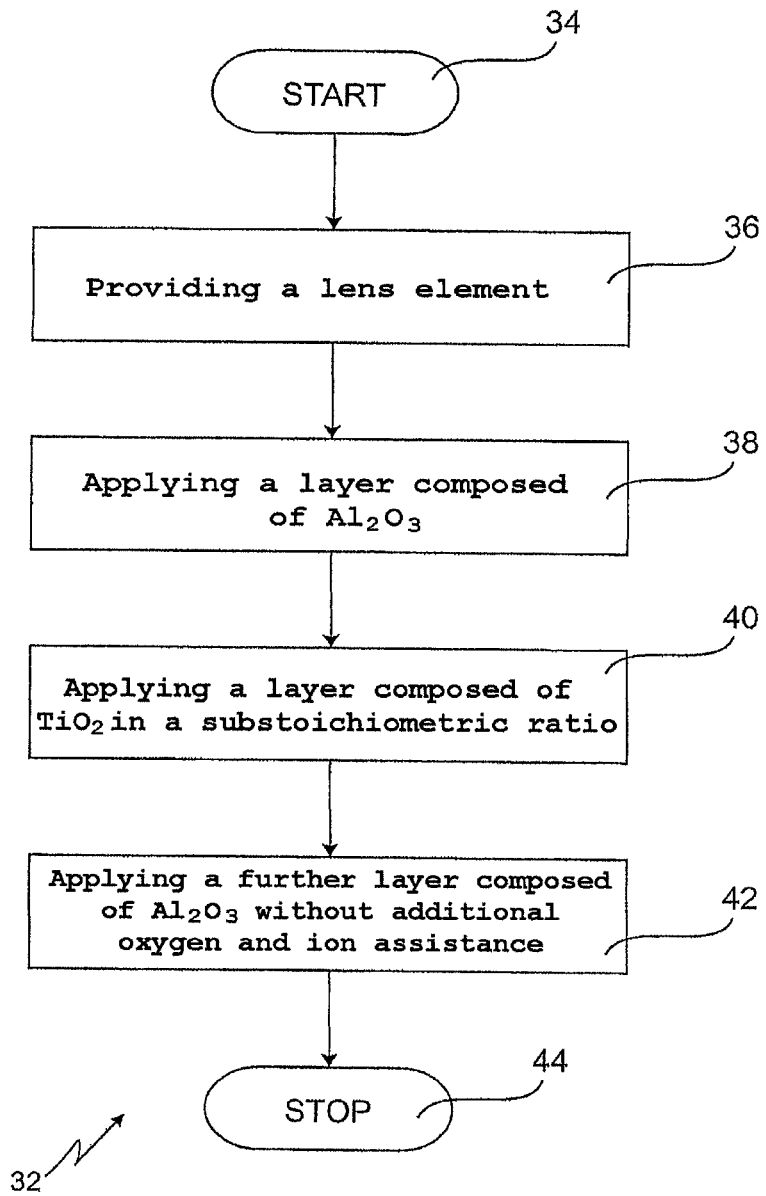
FIG. 5 shows a schematic flowchart of a method according to the invention in an embodiment.

FIG. 5 shows a preferred embodiment of a method 32.

The method 32 begins in a start step 34, whereupon firstly, in a step 36, a lens element 12 is provided.

Subsequently, in a step 38, a layer composed of $Al_2O_3$ is applied. This can be effected by means of one of the PVD, IBAD, CVD, PECVD or PICVD methods mentioned in the introduction. These methods are known in principle to the person skilled in the art.

Between steps 36 and 38, in principle, other layers may also have been applied to the lens element.

The layer composed of $Al_2O_3$ applied in step 38 then forms the second layer 20.

In a step 40, a layer composed of $TiO_2$ in a substoichiometric ratio is then applied directly to the second layer 20 applied in step 38.

Such substoichiometric application can be effected for example by means of a PVD method configured as follows. A typical coating installation can be, for example, the "Boxcoater 1200 DLF" from Satisloh. $Ti_3O_5$ is used as a starting substance. The application rate is approximately 0.4 nm/sec. It is effected in ion source operation with an END-Hall ion source Mark II+ with a discharge voltage of 160 volts and a discharge current of 2 amperes. In addition, 30 sccm $O_2$ (sccm=standard cubic centimeter per minute, corresponds to 1 ccm gas volume per minute under standard conditions, i.e. pressure of 101325 Pa, temperature of 0° C.) is concomitantly admitted during the vapour deposition. In order to obtain the substoichiometric $Ti_{>1}O_{<2}$ layer, overall less than 40 sccm $O_2$ is concomitantly added to the coating area.

The layer applied in step 40 is then the first layer 18.

Subsequently, a further layer composed of $Al_2O_3$ without additional oxygen and ion assistance is applied to the first layer 18 in a step 42. A coating as illustrated in FIG. 4 is thus obtained, which has, besides its antireflective properties, additionally an antistatic effect and can be produced particularly simply without high additional costs.

Finally, the method ends in a step 44 and can subsequently begin anew.

What is claimed is:

1. An optical lens having a lens element and a coating for producing an antistatic effect, said coating being applied onto the lens element and having a plurality of layers, wherein the antistatic effect is provided by at least two layers adjoining one another, wherein the two layers adjoining one another are provided by a first substoichiometrically formed layer of $TiO_x$, with x<2, and a second layer of $Al_2O_3$, wherein the second layer is positioned above the first layer.

2. An optical lens having a lens element and a coating for producing an antistatic effect, said coating being applied onto the lens element and having a plurality of layers, wherein the antistatic effect is provided by at least two layers adjoining one another, wherein at least one of the two layers adjoining one another is formed substoichiometrically, wherein the two layers adjoining one another are provided by a first layer, which is produced from $TiO_x$, and a second layer, which is produced from $Al_2O_3$, wherein the first layer is formed substoichiometrically with an oxygen proportion with x<2, and wherein the second layer is applied after the first layer.

3. The optical lens according to claim 2, wherein a third layer, which is produced from $TiO_2$, is applied onto the second layer.

4. The optical lens according to claim 2, wherein the first layer is formed with an oxygen proportion of more than $TiO_{1.66}$ and less than $TiO_{1.95}$.

5. A method for producing an antistatic coating having a plurality of layers for a lens element, comprising the following steps:

applying a first layer of $TiO_x$, wherein the first layer is applied substoichiometrically with $x<2$, and applying a second layer of $Al_2O_3$ onto the first layer.

6. A method for producing an antistatic coating having a plurality of layers for a lens element, comprising:

applying two layers adjoining one another, wherein the antistatic effect is provided by at least the two layers adjoining one another, wherein at least one of the two layers adjoining one another is formed substoichiometrically, and wherein the two layers adjoining one another are provided by a first layer, which is produced from $TiO_x$, and a second layer, which is produced from $Al_2O_3$, wherein the first layer is formed substoichiometrically with an oxygen proportion with $x<2$, and wherein the second layer is applied after the first layer.

7. The method according to claim 6, wherein a third layer, which is produced from $TiO_2$, is applied onto the second layer.

8. The method according to claim 6, wherein the first layer is formed with an oxygen proportion of more than $TiO_{1.66}$ and less than $TiO_{1.95}$.

* * * * *